US012458665B2

(12) United States Patent
Lee et al.

(10) Patent No.: US 12,458,665 B2
(45) Date of Patent: *Nov. 4, 2025

(54) CERIUM OXIDE NANOCOMPOSITE AND USE THEREOF

(71) Applicant: CENYX BIOTECH INC., Seoul (KR)

(72) Inventors: Seung-Hoon Lee, Seoul (KR); Bong Geun Cha, Seongnam-si (KR); Dong-Wan Kang, Gwacheon-si (KR)

(73) Assignee: CENYX BIOTECH INC., Seoul (KR)

( * ) Notice: Subject to any disclaimer, the term of this patent is extended or adjusted under 35 U.S.C. 154(b) by 544 days.

This patent is subject to a terminal disclaimer.

(21) Appl. No.: 17/914,237

(22) PCT Filed: Mar. 25, 2021

(86) PCT No.: PCT/KR2021/003737
§ 371 (c)(1),
(2) Date: Sep. 23, 2022

(87) PCT Pub. No.: WO2021/194287
PCT Pub. Date: Sep. 30, 2021

(65) Prior Publication Data
US 2023/0114380 A1 Apr. 13, 2023

(30) Foreign Application Priority Data

Mar. 26, 2020 (KR) .................. 10-2020-0036974
Mar. 25, 2021 (KR) .................. 10-2021-0038876

(51) Int. Cl.
*A61K 33/244* (2019.01)
*A61K 9/51* (2006.01)
*A61P 1/16* (2006.01)
*A61P 37/06* (2006.01)

(52) U.S. Cl.
CPC .......... *A61K 33/244* (2019.01); *A61K 9/5138* (2013.01); *A61K 9/5146* (2013.01); *A61P 1/16* (2018.01); *A61P 37/06* (2018.01)

(58) Field of Classification Search
CPC .. A61K 33/244; A61K 9/5138; A61K 9/5146; A61K 33/24; A61P 1/16; A61P 37/06; A61P 29/00; A61P 37/00
See application file for complete search history.

(56) References Cited

U.S. PATENT DOCUMENTS

| 8,333,993 | B1 | 12/2012 | Perez et al. |
| 2010/0015188 | A1 | 1/2010 | Izu et al. |
| 2018/0078510 | A1 | 3/2018 | Alonso Fernandez et al. |
| 2019/0381187 | A1 | 12/2019 | Lee et al. |

FOREIGN PATENT DOCUMENTS

| KR | 10-2018-0043989 A | 5/2018 |
| WO | 2020/043668 A1 | 3/2020 |

OTHER PUBLICATIONS

Communication dated Aug. 20, 2024, issued in U.S. Appl. No. 17/950,499.
Office Action issued Dec. 6, 2023 in U.S. Appl. No. 17/950,612.
Office Action issued Mar. 15, 2024 in U.S. Appl. No. 17/950,612.
Office Action issued Oct. 13, 2023 in U.S. Appl. No. 17/950,638.
Denise Oró, et al., "Cerium oxide nanoparticles reduce steatosis, portal hypertension and display anti-inflammatory properties in rats with liver fibrosis", Journal of Hepatology, 2016, vol. 64, pp. 691-698 (8 pages total).
Office Action issued May 9, 2024 in U.S. Appl. No. 17/950,612.
Jeong, Han-Gil et al., "Ceria Nanoparticles Synthesized With Aminocaproic Acid for the Treatment of Subarachnoid Hemorrhage", Stroke, 2018, pp. 3030-3038, vol. 49, No. 12.
Pulido-Reyes, Gerardo et al., "Internalization and toxicological mechanisms of uncoated and PVP-coated cerium oxide nanoparticles in the freshwater alga *Chlamydomonas reinhardtii*", Environmental Science Nano, The Royal Society of Chemistry, 2019, pp. 1959-1972, vol. 6.
Chen, Yue et al., "The effects of PVP surfactant in the direct and indirect hydrothermal synthesis processes of ceria nanostructures", Ceramics International, 2016, pp. 18516-18520, vol. 42.
International Search Report for PCT/KR2021/003737 dated Jun. 25, 2021.
Korean Patent Office, Communication issued Sep. 4, 2023 in Korean Application No. 10-2021-0038876.
Itoh et al., "Effect of Core-Shell Ceria/Poly(vinylpyrrolidone) (PVP) Nanoparticles Incorporated in Polymer Films and Their Optical Properties", Materials 2013, 6, doi:10.3390/ma6062119, pp. 2119-2129.
Choi et al., "Recent Progress in Autocatalytic Ceria Nanoparticles-Based Translational Research on Brain Diseases", ACS Appl. Nano Mater. 2020, 3, pp. 1043-1062.
European Patent Office, Communication issued Mar. 7, 2024 in European Application No. 21 77 4574.
Martinelli et al., "Antioxidants and Nanotechnology: Promises and Limits of Potentially Disruptive Approaches in the Treatment of Central Nervous System Diseases", Adv. Healthcare Mater. 2020, 9, 1901589.

(Continued)

*Primary Examiner* — Jessica Worsham
(74) *Attorney, Agent, or Firm* — Sughrue Mion, PLLC

(57) ABSTRACT

A cerium oxide nanocomplex, a method for preparing the cerium oxide nanocomplex, a composition containing the cerium oxide nanocomplex as an active ingredient, and a method for preventing or treating inflammatory or autoimmune diseases. The composition may be used as an efficient nanoparticle therapeutic composition by applying a biocompatible dispersion stabilizer composed of an optimal combination to significantly improve the biomedical stability, biocompatibility, and efficiency of the production process of nanoparticles while maintaining the intrinsic pharmacological effect of the nanoparticles.

13 Claims, 8 Drawing Sheets

(56) References Cited

OTHER PUBLICATIONS

Song et al., "Ceria Nanoparticles Stabilized by Organic Surface Coatings Activate the Lysosome-Autophagy System and Enhance Autophagic Clearance", ACS Nano, vol. 8, No. 10, 2014, pp. 10328-10342.

100% aqueous solvent     70% ethyl alcohol solvent

CERIUM OXIDE NANOCOMPOSITE AND USE THEREOF

CROSS REFERENCE TO RELATED APPLICATIONS

This application is a National Stage of International Application No. PCT/KR2021/003737 filed Mar. 25, 2021, claiming priority based on Korean Patent Application No. 10-2020-0036974 filed Mar. 26, 2020 and Korean Patent Application No. 10-2021-0038876 filed Mar. 25, 2021.

TECHNICAL FIELD

The present disclosure relates to a cerium oxide nanocomplex coated with a biocompatible dispersion stabilizer and a composition for preventing or treating inflammatory diseases, containing the cerium oxide nanocomplex as an active ingredient.

BACKGROUND ART

Nanoparticles, which have been applied for various purposes in the field of diagnosis and treatment, exhibit new physical/chemical properties different from bulk materials in vivo due to their nanoscale size. Currently, many studies on the nanoparticles have been conducted and, in this regard, vigorous efforts have been made to develop nanoparticles that exhibit optimal properties suitable for medical use by adjusting the particles' composition, shape, size, and properties, etc. as appropriate to the purpose Meanwhile, cerium oxide has thermal stability at high temperature and has a redox reaction of $Ce^{4+}/Ce^{3+}$ depending on the surrounding oxygen concentration due to its lattice structure, and thus has had various applications such as electrolytes of solid batteries, compositions for UV filters, oxygen sensors, optical devices, etc. Especially in the medical field, cerium oxide has been spotlighted as a therapeutic composition for a wide range of diseases caused by oxidative stress and inflammation due to its excellent ability to scavenge reactive oxygen species.

With a common method for synthesis of cerium oxide nanoparticles, it is not only difficult to uniformly distribute the particles in a nanoscale, but also it is not easy to synthesize the particles in a fine size of 10 nm or less. For example, cerium oxide nanoparticles synthesized through a hydrothermal method, which is one of the aqueous phase-based methods, usually have a size ranging from several hundred nm to several microns, and because of this, it is difficult to precisely control the particle size and the particles show poor dispersibility. Therefore, methods for preparing cerium oxide nanoparticles having a smaller average particle size and a uniform size distribution have been proposed, but these methods are not suitable for industrial bulk production because they require an inefficient process involving a high-temperature processing at hundreds of ° C.

Accordingly, there is a need to develop a new method that may efficiently produce cerium oxide nanoparticles that have a size of 50 nm or less, uniform size distribution and good dispersibility, are facile to produce and maintain a unique antioxidant effect in a moderate reaction condition.

A number of papers and patent documents are referenced throughout the present specification and citations thereof are shown. The disclosure of the cited papers and patent documents is incorporated herein by reference in their entirety to more clearly describe the level of the technical field to which the present disclosure pertains and the content of the present disclosure.

DISCLOSURE

Technical Problem

The present inventors have made intensive efforts to develop an excellent cerium oxide nanostructure that maintains the intrinsic pharmacological effect while having further improved biomedical stability, biocompatibility, and efficiency in production process of the nanoparticles. As a result, the present disclosure has been completed by finding that when a polymer layer in which a monomer of a pyrrolidone derivative of Formula 1 is repeated; and a biocompatible dispersion stabilizer layer are formed in the core of the cerium oxide nanoparticles, uniform and fine particles may be stably and economically bulk-produced for a sufficient reaction time without applying a harsh environment such as a strong base and/or strong acid condition at a high temperature.

Thus, an object of the present disclosure is to provide a cerium oxide nanocomplex and a method for preparing the same.

Another object of the present disclosure is to provide a composition for preventing or treating inflammatory or autoimmune diseases, containing the cerium oxide nanocomplex according to the present disclosure as an active ingredient.

Other objects and advantages of the present disclosure will be made clearer by the following detailed description of the disclosures, claims and drawings.

Technical Solution

In an aspect, there is provided a cerium oxide nanocomplex containing:
(a) core layer of cerium oxide nanoparticles;
(b) an inner layer including a polymer represented by the following Formula 1:

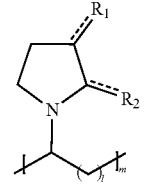

[Formula 1]

wherein $R_1$ and $R_2$ are each independently hydrogen or oxygen, ═ represents a single bond or a double bond, l is 1 or 2, and m is an integer of 100 to 1000; and
(c) an outer layer including one or more of biocompatible dispersion stabilizers selected from the group consisting of polyglutamic acid (PGA), poly(aspartic acid) (PASP), alginate, poly(acrylic acid) (PAA), poly(methacrylic acid) (PMAA), poly(methyl methacrylic acid), poly(maleic acid) (PMA), poly(butadiene/maleic acid) (PBMA), poly(vinylphosphonic acid) (PVPA), poly(styrenesulfonic acid) (PSSA), polyvinyl alcohol (PVA), and dextran.

The present inventors have made intensive efforts to develop an excellent cerium oxide nanostructure that maintains the intrinsic pharmacological effect while having further improved biomedical stability, biocompatibility, and efficiency in production process of the nanoparticles. As a result, the present inventors have found that when a polymer layer in which a monomer of a pyrrolidone derivative of Formula 1 is repeated; and a biocompatible dispersion stabilizer layer are formed in the core of the cerium oxide nanoparticles, uniform and fine particles may be stably and economically bulk-produced for a sufficient reaction time without a harsh environment such as a strong base and strong acid condition at a high temperature.

The related art requires a strong acid/strong base such as HCl and NaOH at a high temperature of 95° C. for an extremely short reaction time within 1 minute because polyethylene glycol (PEG) or a PEG derivative modified with a succinimidyl group is mainly used in order to ensure stability in vivo in the synthesis process of the cerium oxide nanoparticles, and thus has suffered great difficulties in obtaining a large amount of uniform particles. However, the nanocomplex according to the present disclosure secures stable synthesis conditions such as a reaction time of about 2 hours at 70° C., but also does not require a strong acid or strong base environment, and thus, has effectively overcome the disadvantages of the related art.

As used herein, the term "core layer" refers to an innermost layer having only one surface in contact with other layers in a multilayer composite.

As used herein, the term "multilayer composite" refers to a composite consisting of a plurality of layers composed of different components, and includes, without limitation, a laminated multilayer structure, a core-shell multilayer structure, and combinations thereof. Specifically, the multilayer composite according to the present disclosure has a core-shell type multilayer structure in which nanoparticles are present at the center and the polymer of Formula 1 and a biocompatible dispersion stabilizer surround the nanoparticles on the outer shell.

As used herein, the term "inner layer" refers to a layer closer to the core than the outer layer, and the term "outer layer" refers to a layer that surrounds the inner layer of a core-shell structure and is further away from the core than the inner layer. The inner layer does not necessarily have to be a layer in direct contact with the core layer and an additional layer closer to the core layer than the inner layer may be present. The outer layer also does not necessarily have to be an outermost layer, and the outermost layer located farther away from the core than the outer layer may be further present.

According to the present disclosure, the boundary between the core layer and the inner layer is clearly distinguished, but the boundary between the inner layer and the outer layer may or may not be clearly distinguished. If a boundary between the inner layer and the outer layer is not clear, each component of the inner layer and the outer layer may be mixed in the vicinity of the interface or in the entire section.

As used herein, the term "polymer" refers to a synthetic or natural polymer compound in which the same or different types of monomers are continuously linked. Thus, the polymer includes a homopolymer (a polymer in which one type of monomer is polymerized) and an interpolymer prepared by the polymerization of at least two different monomers, wherein the interpolymer includes both a copolymer (a polymer prepared from two different monomers) and a polymer prepared from more than two different monomers. Specifically, the polymer of Formula 1 used in the present disclosure is a homopolymer.

As used herein, the term "alkyl" refers to a straight or branched chain, saturated hydrocarbon group, and includes, for examples, methyl, ethyl, propyl, isopropyl, etc. $C_1$-$C_3$ alkyl refers to an alkyl group having an alkyl unit having 1 to 3 carbon atoms, and when $C_1$-$C_3$ alkyl is substituted, the number of carbon atoms in the substituent is not included.

As used herein, the term "biocompatibility" refers to a property of not causing short-term or long-term side effects when administered in vivo and in contact with cells, tissues or body fluids of organs, and specifically, refers to not only tissue compatibility and blood compatibility that do not cause tissue necrosis or blood coagulation in contact with biological tissue or blood, but also biodegradability, which is a property of being disappeared after a certain period of time after in vivo administration of the material, and "excretability, which is a property of being excreted outside the body without accumulation after in vivo administration of the material." Thus, the term "biocompatible dispersion stabilizer" refers to a component that improves the dispersibility of particles while having the biocompatibility described above.

As used herein, the term "biodegradability" refers to a property of the material to naturally decompose when exposed to a physiological solution having a pH of 6 to 8, and specifically, refers to a property in which the material may be decomposed over time by body fluids, decomposing enzymes, or microorganisms, etc., in vivo.

According to a specific embodiment of the present disclosure, the cerium oxide nanoparticles used in the present disclosure may be cerium(IV) oxide ($CeO_2$), cerium(III) oxide ($Ce_2O_3$), or a mixture thereof.

According to a specific embodiment of the present disclosure, in Formula 1, $R_1$ is hydrogen, $R_2$ is oxygen, and l is 1. According to an octet rule, it is obvious that when $R_1$ is hydrogen, ═══ is a single bond, and when $R_2$ is oxygen, ═══ is a double bond. The compound of Formula 1 wherein $R_1$ is hydrogen, $R_2$ is oxygen, and l is 1 is polyvinylpyrrolidone (PVP).

According to a specific embodiment of the present disclosure, the biocompatible dispersion stabilizer included in the outer layer is polyglutamic acid (PGA). Polyglutamic acid (PGA) may be poly-α-glutamic acid, poly-β-glutamic acid, or poly-γ-glutamic acid, specifically poly-α-glutamic acid. Most specifically, the poly-α-glutamic acid is poly(L-glutamic acid) (PLGA).

According to a specific embodiment of the present disclosure, the nanocomplex according to the present disclosure further includes a multifunctional ligand represented by the following Formula 2:

[Formula 2]

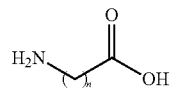

wherein n is an integer of 3 to 7.

As used herein, the term "multi-functional ligand" refers to a molecule having two or more active functional groups and binding to two or more molecules, thereby serving as a linker between the molecules. The multi-functional ligand of Formula 2 used in the present disclosure has a carboxyl group capable of binding to cerium oxide nanoparticles and an amine group capable of binding to PVP in the inner layer and/or PGA, PVA or dextran in the outer layer to enable the nanocomplex according to the present disclosure to be formed more efficiently and stably.

Specifically, in the above Formula 2, n is 5. The compound of Formula 2 wherein n is 5 is 6-aminohexanoic acid (6-AHA).

According to a specific embodiment of the present disclosure, the nanocomplex according to the present disclosure has an average particle size of 5 nm to 100 nm. The nanocomplex has an average particle size of more specifically 5 nm to 80 nm, and most specifically 5 nm to 50 nm.

According to another aspect of the present disclosure, the present disclosure provides a composition for preventing or treating inflammatory or autoimmune diseases, containing the nanocomplex according to the present disclosure as an active ingredient.

The cerium oxide nanocomplex used in the present disclosure has already been described above, and thus description thereof is omitted to avoid excessive overlap.

As used herein, the term "prevention" refers to inhibiting the development of a disease or condition in a subject who has not been diagnosed with the disease or condition, but is likely to be afflicted with such a disease or illness.

As used herein, the term "treatment" refers to (a) suppressing the progression of the disease, illness, or symptom; (b) alleviating the disease, illness, or symptom; or (c) eliminating the disease, illness, or symptom. The composition according to the present disclosure reduces reactive oxygen species and suppresses the expression of inflammatory cytokines to inhibit, eliminate or alleviate the development of symptoms caused by an excessive or unwanted immune response or inflammation. Thus, the composition according to the present disclosure may itself be a composition for treating these diseases, or may be administered in conjunction with other pharmacological ingredients having an anti-inflammatory effect and applied as a therapeutic adjuvant for the above diseases. Accordingly, as used herein, the term "treatment" or "therapeutic agent" includes the meaning of "therapeutic aid" or a "therapeutic adjuvant."

As used herein, the term "administration" refers to administration of a therapeutically effective amount of the composition according to the present disclosure directly to a subject so that the same amount is formed in the body of the subject, and has the same meaning as "transplantation" or "injection."

As used herein, the term "therapeutically effective amount" refers to the amount of the composition contained in an amount sufficient to provide a therapeutic or prophylactic effect to an individual who wishes to administer the composition according to the present disclosure, and is therefore meant to include "prophylactically effective amount."

As used herein, the term "subject" includes, without limitation, human, mouse, rat, guinea pig, dog, cat, horse, cow, pig, monkey, chimpanzee, baboon, or rhesus monkey. Specifically, as used herein, the subject is a human.

According to a specific embodiment of the present disclosure, the inflammatory or autoimmune diseases prevented or treated with the composition according to the present disclosure are one or more diseases selected from the group consisting of rheumatoid arthritis, reactive arthritis, type 1 diabetes, systemic lupus erythematosus, multiple sclerosis, idiopathic pulmonary fibrosis, polymyositis, dermatomyositis, localized scleroderma, systemic scleroderma, inflammatory bowel disease, Sjogren's syndrome, Raynaud's phenomenon, Bechet's disease, Kawasaki's disease, primary biliary sclerosis, primary sclerosing cholangitis, ulcerative colitis, Crohn's disease, psoriasis, myasthenia gravis, autoimmune vasculitis, primary angiitis of the central nervous system, subarachnoid hemorrhage (SAH), severe cerebral infarction, intracerebral hemorrhage, hypoxic ischemic encephalopathy, traumatic brain/spinal cord injury, acute respiratory distress syndrome, cytokine storm syndrome, sepsis, and inflammatory liver disease, and more specifically, the inflammatory or autoimmune diseases are selected from the group consisting of subarachnoid hemorrhage, sepsis, cytokine storm syndrome, and inflammatory liver disease.

As used herein, the term "inflammatory liver disease" refers to a series of diseases accompanied by damage to the liver tissue caused by excessive or unwanted immune or inflammatory responses induced by a variety of causes as a direct or indirect cause.

More specifically, the inflammatory liver disease is selected from the group consisting of viral hepatitis, toxoplasma hepatitis, alcoholic liver disease, toxic liver disease, acute and subacute hepatic failure, liver abscess, nonspecific reactive hepatitis, liver infarction, hepatic veno-occlusive disease, injury of liver or gallbladder, and liver transplantation-related hepatitis.

When the composition according to the present disclosure is prepared as a pharmaceutical composition, the pharmaceutical composition according to the present disclosure contains a pharmaceutically acceptable carrier. Pharmaceutically acceptable carriers contained in the pharmaceutical composition according to the present disclosure are commonly used in preparation, and examples thereof include, but are not limited to, lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methyl cellulose, methyl hydroxybenzoate, propyl hydroxybenzoate, talc, magnesium stearate, and mineral oil, etc. The pharmaceutical composition according to the present disclosure may further contain lubricants, wetting agents, sweetening agents, flavoring agents, emulsifying agents, suspending agents, preservatives, etc., in addition to the above components. Suitable pharmaceutically acceptable carriers and formulations are described in detail in Remington's Pharmaceutical Sciences (19th ed., 1995).

The pharmaceutical composition according to the present disclosure may be administered through various routes of administration, specifically, parenterally, and more specifically, orally, intravenously, intraarterially, subcutaneously, intraperitoneally, intradermally, intramuscularly, intraventricularly, intrathecally, inhalationally, nasally, intraarticularly, or topically.

A suitable dosage of the pharmaceutical composition according to the present disclosure may be variously prescribed depending on factors such as formulation method, administration mode, age, weight, sex, pathological condition, food, administration time, administration route, excretion rate, and response sensitivity of the patient. A preferred dosage of the pharmaceutical composition according to the present disclosure is within the range of 0.0001 to 100 mg/kg for adults.

The pharmaceutical composition according to the present disclosure may be prepared in unit dosage form by formulating with a pharmaceutically acceptable carrier and/or excipient, or may be prepared by introduction into a multi-dose container, according to a method that may be easily carried out by a person of ordinary skill in the art to which the present disclosure pertains. In this case, the preparation may be in the form of solutions, suspensions, syrups, or emulsions in oil or aqueous medium, or may also be in the form of extracts, powders, granules, tablets or capsules, and may additionally include dispersants or stabilizers.

According to another aspect of the present disclosure, the present disclosure provides a method for preventing or treating inflammatory or autoimmune diseases, including administering to a subject a cerium oxide nanocomplex according to the present disclosure or a pharmaceutical composition containing the same as an active ingredient. The cerium oxide nanocomplex used in the present disclosure and the inflammatory or autoimmune diseases that may be prevented or treated through the cerium oxide nanocomplex have already been described above, and thus the description thereof will be omitted to avoid excessive overlap.

According to another aspect of the present disclosure, there is provided a method for preparing a cerium oxide nanocomplex including:
(a) preparing a mixed solution by adding a cerium precursor, a polymer represented by the following Formula 1, and a crosslinking compound represented by the following Formula 2 to a $C_1$-$C_3$ alcoholic solvent;

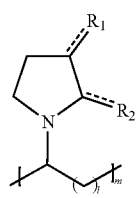

[Formula 1]

wherein $R_1$ and $R_2$ are each independently hydrogen or oxygen, $\text{---}$ represents a single bond or a double bond, l is 1 or 2, and m is an integer of 100 to 1000;

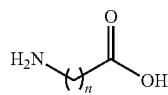

[Formula 2]

wherein n is an integer of 3 to 7;
(b) sequentially heating and cooling the mixed solution to obtain cerium oxide nanoparticles; and
(c) mixing the cerium oxide nanoparticles and one or more biocompatible dispersion stabilizers selected from the group consisting of polyglutamic acid (PGA), poly(aspartic acid) (PASP), alginate, poly(acrylic acid) (PAA), poly(methacrylic acid) (PMAA), poly(methyl methacrylic acid), poly(maleic acid) (PMA), poly(butadiene/maleic acid) (PBMA), poly(vinylphosphonic acid) (PVPA), poly(styrenesulfonic acid) (PSSA), polyvinyl alcohol (PVA), and dextran in the $C_1$-$C_3$ alcoholic solvent to obtain a cerium oxide nanocomplex coated with the biocompatible dispersion stabilizer.

As used herein, the term "coating" refers to forming a new layer having a certain thickness by applying a specific material on a target surface, and the target surface and the coating material may be coated through ionic or non-covalent bond. The term "non-covalent bond" is a concept that includes not only physical bonds such as adsorption, cohesion, entanglement, and entrapment, but also bonds in which the interaction such as hydrogen bonds and van der Waals bonds occurs alone or in combination with the physical bonds described above. When coated with a biocompatible dispersion stabilizer in the present disclosure, the stabilizer layer may form a closed layer while completely surrounding the surface to be modified, or may form a partially closed layer.

According to a specific embodiment of the present disclosure, the $C_1$-$C_3$ alcoholic solvent is ethanol.

According to a specific embodiment of the present disclosure, the cerium precursor is one or more precursors selected from the group consisting of cerium(III) acetate hydrate, cerium(III) acetylacetonate hydrate, cerium(III) carbonate hydrate, cerium(III) fluoride, cerium(III) chloride, cerium(III) chloride heptahydrate, cerium(III) bromide, cerium(III) iodide, cerium(III) nitrate hexahydrate, cerium (III) oxalate hydrate, cerium(III) sulfate, and cerium(III) sulfate hydrate. More specifically, the cerium precursor is cerium(III) nitrate hexahydrate.

According to a specific embodiment of the present disclosure, the heating is performed at 60 to 75° C. As described above, one of the advantages of the present disclosure is that it is suitable for bulk production on an industrial scale, because a sufficient reaction process may be stably continued at a temperature around 70° C., unlike the prior art capable of reacting only for a short period of time at a high temperature of 95° C.

Advantageous Effects

The features and advantages of the present disclosure are summarized as follows:
(a) the present disclosure provides a cerium oxide nanocomplex, a method for preparing the same, and a composition for preventing or treating inflammatory or autoimmune diseases, containing the cerium oxide nanocomplex as an active ingredient, and
(b) the present disclosure may be usefully used as an efficient nanoparticle therapeutic composition by applying a biocompatible dispersion stabilizer composed of an optimal combination to significantly improve the biomedical stability, biocompatibility, and efficiency of the production process of nanoparticles while maintaining the intrinsic pharmacological effect of the nanoparticles.

BEST MODE

Hereinafter, the present disclosure will be described in detail with reference to the following examples. These examples are only for illustrating the present disclosure in more detail, and it will be apparent to those of ordinary skill in the art that the scope of the present disclosure is not limited by these examples according to the gist of the present disclosure.

EXAMPLES

Example 1: Synthesis of Cerium Oxide Nanocomplex

Figure 1:
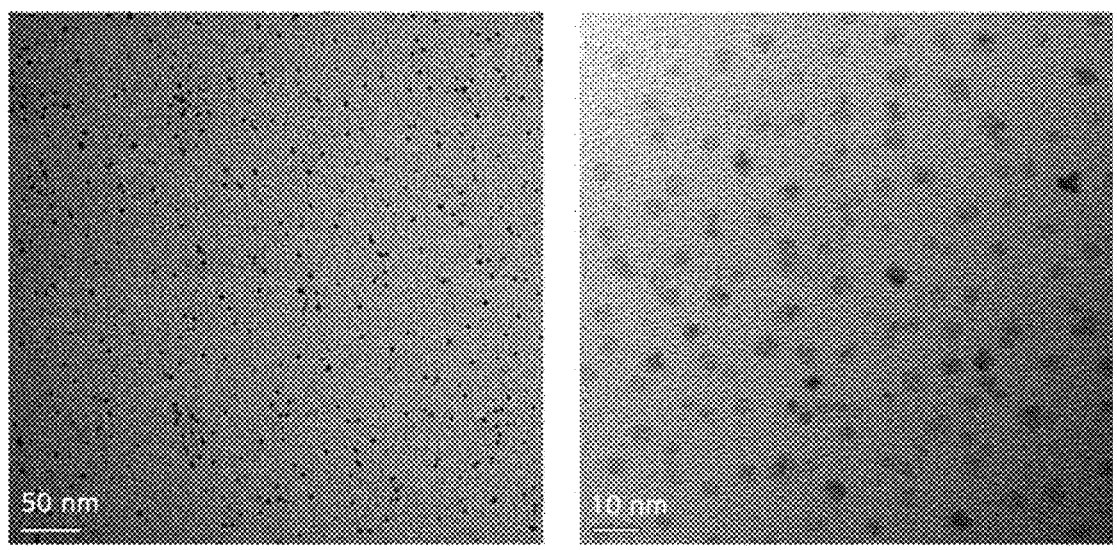
FIG. 1 is a diagram illustrating a transmission electron microscope image of a cerium oxide nanocomplex according to the present disclosure.

A first solution was prepared by dissolving 6-aminohexanoic acid (6-AHA) (0.65585 g, Sigma-Aldrich, St. Louis, MO) in deionized water (30 mL). A third solution was prepared by adding a second solution in which polyvinylpyrrolidone (PVP) (2.0 g, Sigma-Aldrich, St. Louis, MO) was dissolved in ethyl alcohol (25 mL) and heating the second solution to 70° C. in air while stirring the first solution. Meanwhile, a fourth solution was prepared by dissolving cerium(III) nitrate hexahydrate ($Ce(NO_3)_3 \cdot 6H_2O$, 0.540 g, Alfa Aeser, Ward Hill, MA) in ethyl alcohol (50 mL) at room temperature (about 20° C.). Thereafter, a fifth solution was prepared by adding the fourth solution to the third solution. Then, the temperature of the fifth solution was maintained at 70° C. for 2 hours, and then cooled to room temperature (about 20° C.). Through such a process, cerium oxide nanoparticles in which 6-aminohexanoic acid and polyvinyl pyrrolidone were bound to the surface, were obtained (see FIG. 1). Next, the cerium oxide nanoparticles were washed three times with acetone to remove unreacted materials.

Example 2: Synthesis Trend of Cerium Oxide Nanocomplex Depending on Solvent

In order to identify the formation tendency of particles depending on the synthetic solvent, the formation state of the cerium oxide nanocomplex was confirmed by using a 100% aqueous solvent or a 70% ethyl alcohol solvent.

100% Aqueous Solvent:

A first solution was prepared by dissolving 6-aminohexanoic acid (0.65585 g, Sigma-Aldrich, St. Louis, MO) in deionized water (30 mL), and a third solution was prepared by adding a second solution in which polyvinylpyrrolidone (2.0 g, Sigma-Aldrich, St. Louis, MO) was dissolved in deionized water (25 mL) during stirring of the first solution, and then heating the second solution to 70° C. in air. Meanwhile, a fourth solution was prepared by dissolving cerium(III) nitrate hexahydrate ($Ce(NO_3)_3 \cdot 6H_2O$, 0.540 g, Alfa Aeser, Ward Hill, MA) in deionized water (50 mL) at room temperature (about 20° C.). Thereafter, a fifth solution was prepared by adding the fourth solution to the third solution. Then, the temperature of the fifth solution was maintained at 70° C. for 2 hours, and then cooled to room temperature (about 20° C.) to obtain cerium oxide nanoparticles in which 6-aminohexanoic acid and polyvinylpyrrolidone were bonded to the surface. Next, the cerium oxide nanoparticles were washed three times with acetone to remove unreacted materials.

70% ethyl alcohol solvent: The solvent was obtained in the same manner as in the Example 1.

Figure 2:
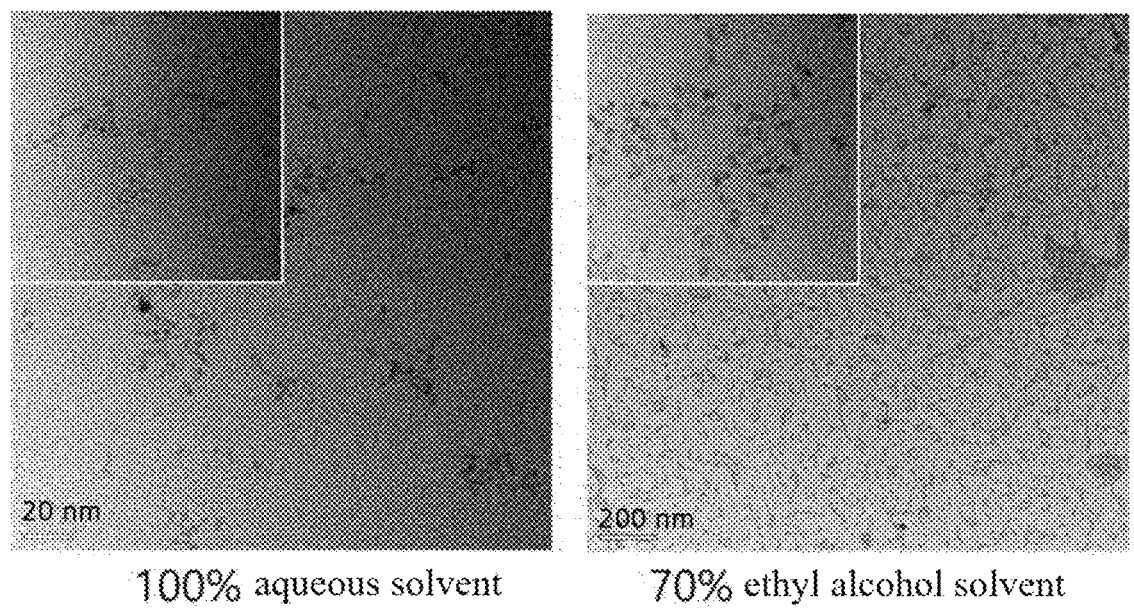
FIG. 2 is a diagram illustrating results of analyzing the shape and dispersion of the cerium oxide nanocomplex depending on the properties of the solvent.

As the result of analyzing the transmission electron microscopy image, it could be confirmed that the cerium oxide nanocomplex synthesized with 100% aqueous solvent was difficult to identify the individual dispersibility of the particles, and was entangled with each other and aggregated like a spider web, whereas the cerium oxide nanocomplex synthesized with 70% ethyl alcohol solvent had high dispersibility of particles (see FIG. 2). It was found from the above results that the alcohol solvent is more advantageous than the aqueous solvent in terms of the reaction rate and stable dispersibility of the particles.

Example 3: Structure Formation of Cerium Oxide Nanocomplex Depending on Components of Synthesis Reactant In order to confirm a structural change of the nanocomplex depending on whether or not 6-aminohexanoic acid and polyvinyl pyrrolidone is present during a synthesis process, 6-AHA and PVP were sequentially excluded from the synthesis process of Example 1, and finally, the experiment was conducted in a form including all additives. The particle size was analyzed using dynamic light scattering device.

Figure 3:
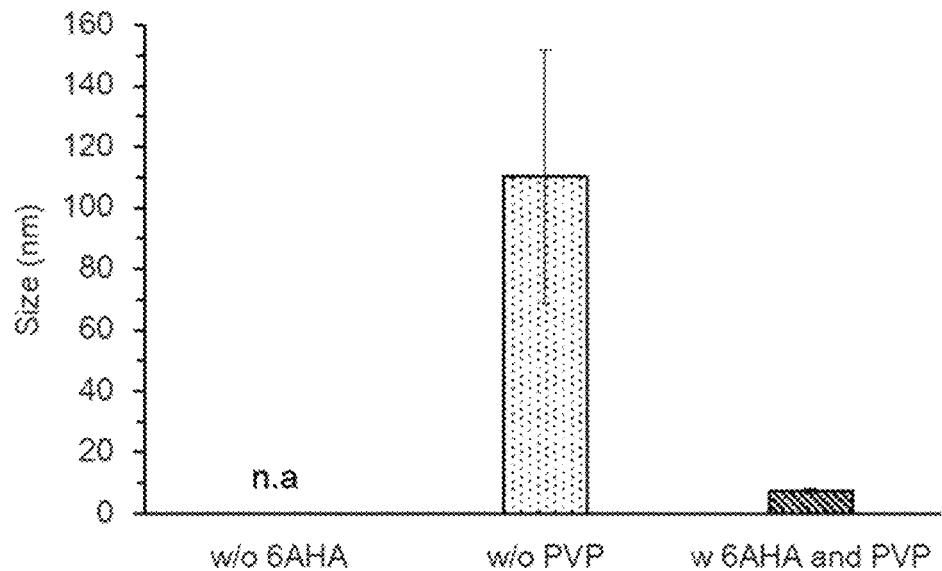
FIG. 3 is a diagram illustrating a particle size change of the cerium oxide nanocomplex depending on whether or not the compound is present.
Figure 4:
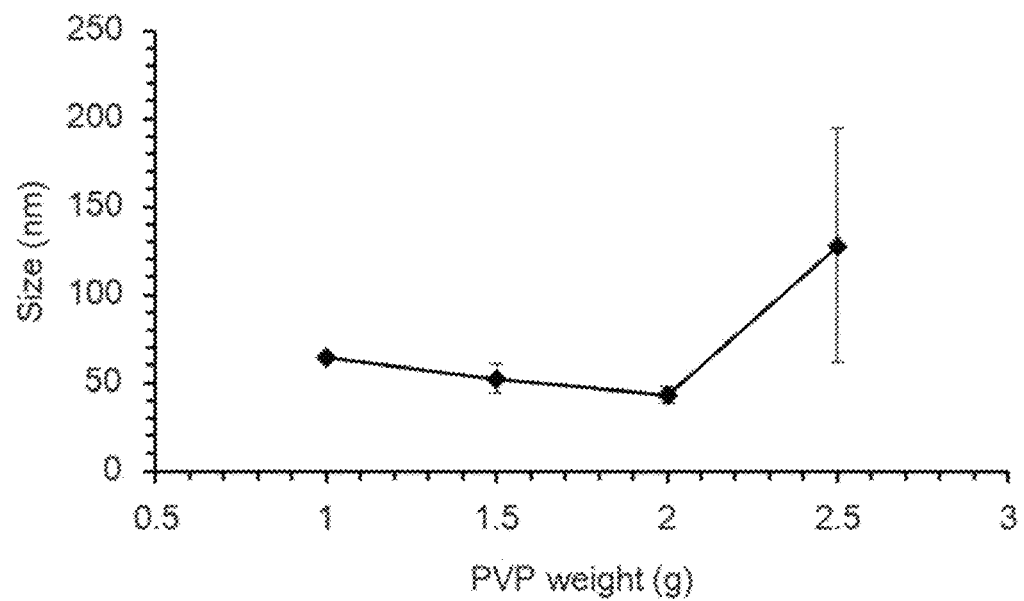
FIG. 4 is a diagram illustrating results of analyzing the particle size change depending on the amounts of polyvinyl pyrrolidone.

As a result, it was confirmed that no particles were formed in the absence of 6-AHA, and very large particles of 100 nm or more were formed in the absence of PVP, whereas uniform particles of 10 nm size were synthesized only when both 6-AHA and PVP were added to the synthesis (see FIG. 3). Accordingly, it was confirmed that when two compounds, 6-AHA and PVP, were complementarily participated in the synthesis and were applied simultaneously, nanocomplex having a stable size and dispersity as a biomaterial may be efficiently obtained.

Example 4: Change in Formation of Nanocomplex Depending on Amounts of PVP

In order to confirm the tendency of nanocomplex formation depending on the amounts of PVP serving as a dispersion stabilizer in the present disclosure, the change in the nanocomplex formation was examined by using PVP of various amounts of 1.0, 1.5, 2.0 and 2.5 g in the synthesis process of Example 1. As a result of analyzing the synthesized particle size through dynamic light scattering analysis, it was possible to obtain uniform particles of the smallest size when PVP was used in a dose of 2.0 g (19 mg/ml). Considering the effect of the size of the nanocomplex on dispersity, function and biological stability, it can be said that this is the result of finding for the most suitable synthesis conditions.

Figure 5:
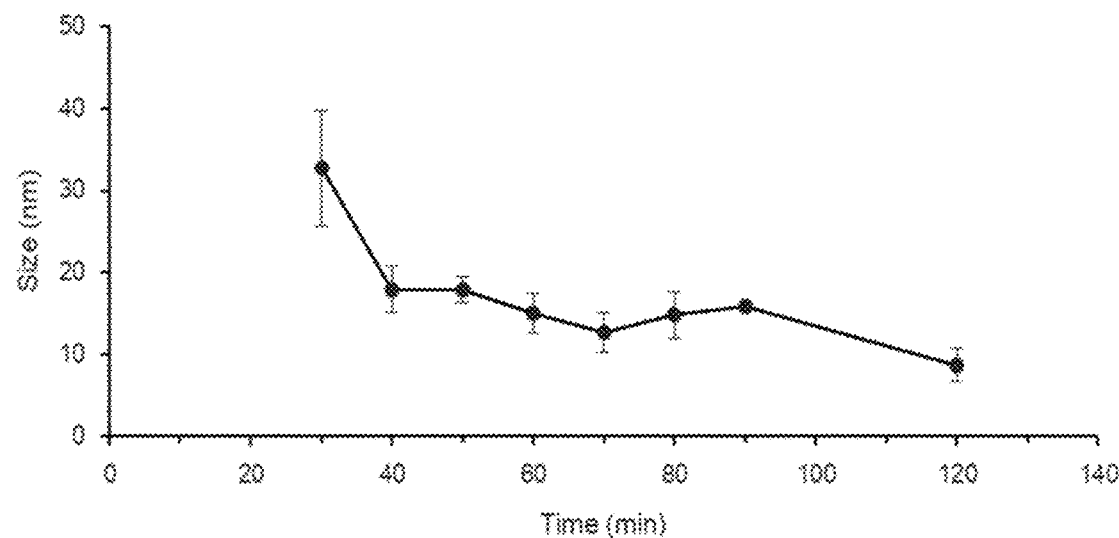
FIG. 5 is a diagram illustrating results of analyzing the particle size for each reaction time of the cerium oxide nanocomplex using a dynamic light scattering device.

Example 5: Size Formation Trend of Cerium Oxide Nanocomplex Depending on Synthesis Time In order to identify the particle size and stability of the cerium oxide nanocomplex that may be synthesized through Example 1 for each synthesis retention time, while the reaction of the fifth solution was maintained, samples were taken every 30, 40, 50, 60, 70, 80, 90, and 120 minutes, and the particle size was analyzed using dynamic light scattering device. As a result, it was confirmed that as the reaction time elapsed, the particle size gradually decreased from 30 nm to 5 nm, and each sample collected for each time had a very stable particle size. Therefore, it was confirmed that the method of the present disclosure is a process capable of manufacturing nanoparticles with remarkably excellent uniformity (see FIG. 5).

Example 6: Coating of Cerium Oxide Nanocomplex with Biodispersion Stabilizer

A suspension was prepared by adding 3.5 mg of cerium oxide nanoparticles prepared through the above-mentioned process to 0.8 mL of sodium acetate buffer (2.5 mM). The suspension was mixed with 0.3 μmol of polyglutamic acid (PLGA) (weight average molecular weight: 9,000) or the same weight of polyvinyl alcohol (PVA) (weight average molecular weight: 9,500) and dextran (weight average molecular weight: 6,000) dissolved in 1.2 mL of sodium acetate buffer. The cerium oxide nanocomplex was obtained by stirring the mixture at room temperature for 5 minutes and combining positively charged 6-AHA bound to the surface of the cerium oxide nanoparticles and surface negatively charged the polyglutamic acid, polyvinyl alcohol, dextran, etc., by electrostatic attraction.

Figure 6A:
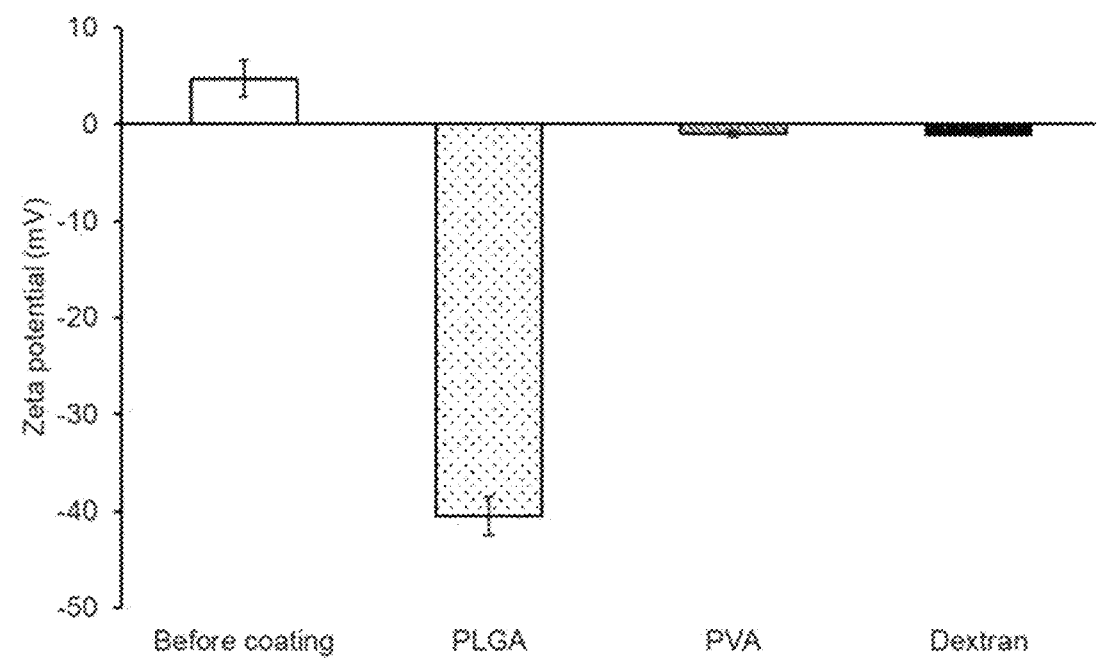
FIG. 6A is a diagram showing results of checking whether or not the cerium oxide nanocomplex are coated with a biocompatible dispersion stabilizer using a surface potential analysis device.

It was confirmed that the cerium oxide nanocomplex had a surface potential value of 5 mV before coating with a biocompatible dispersion stabilizer, and had a charge value of −40 mV after coating with PLGA, and a charge value close to −1 mV after coating with PVA and dextran, respectively. Also, it was confirmed that different biocompatible dispersion stabilizers were coated on the cerium oxide nanoparticles through this method (see FIG. 6A).

Figure 6B:
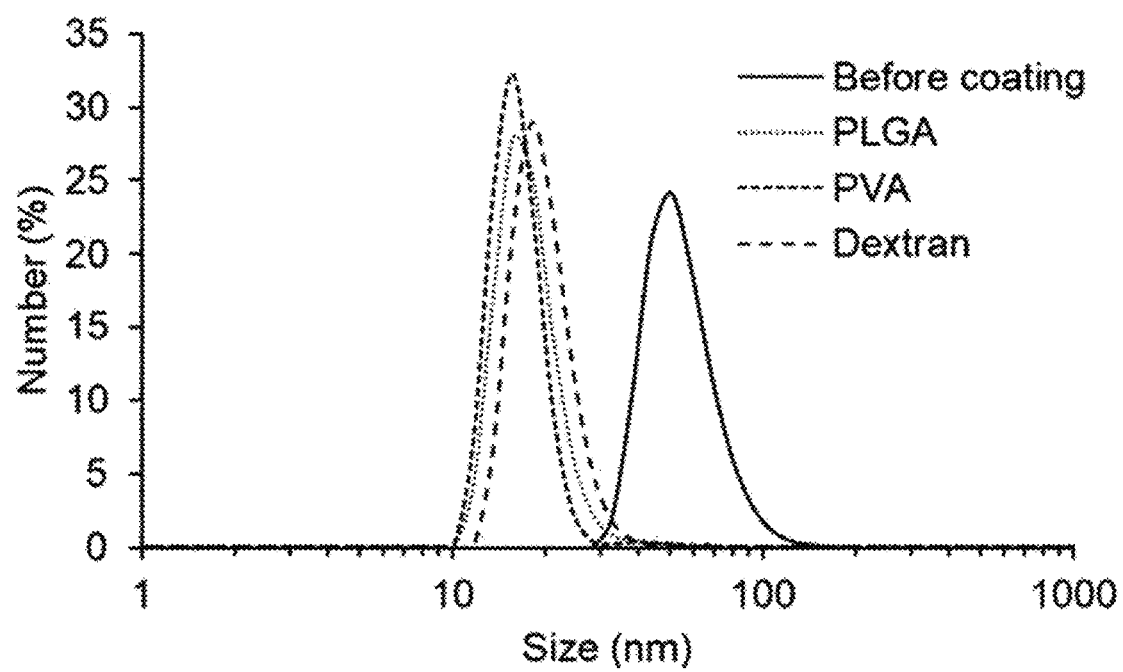
FIG. 6B illustrates results of analyzing the particle size of the cerium oxide nanocomplex using a dynamic light scattering device.

It was confirmed that in a dispersing environment of normal saline (an aqueous 0.9% (w/w) sodium chloride solution) that simulates the environment for use in actual biomedical applications, the cerium oxide nanocomplex had a size of 50 to 100 nm before coating with the biocompatible dispersion stabilizer, and the dispersion size was improved from 10 to 50 nm in all conditions using each dispersion stabilizer after coating with the biocompatible dispersion stabilizer (FIG. 6B).

Example 7: Evaluation of Antioxidant Effect of Cerium Oxide Nanocomplex

Figure 7A:
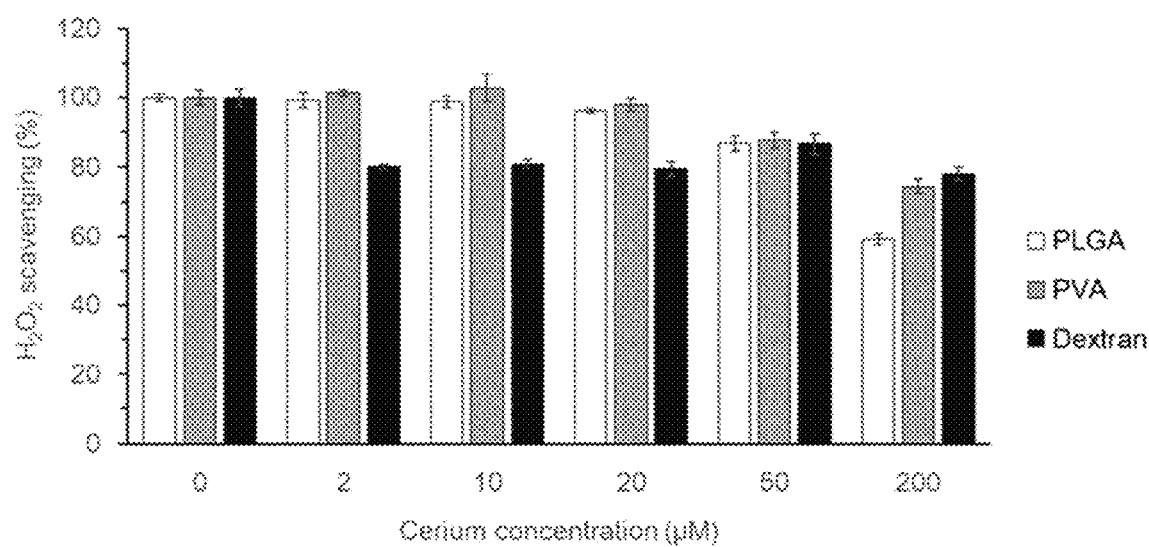
FIG. 7A and FIG. 7B are diagrams illustrating the evaluation results of hydrogen peroxide and hydroxyl radical scavenging capacity of the cerium oxide nanocomplex.
Figure 7B:
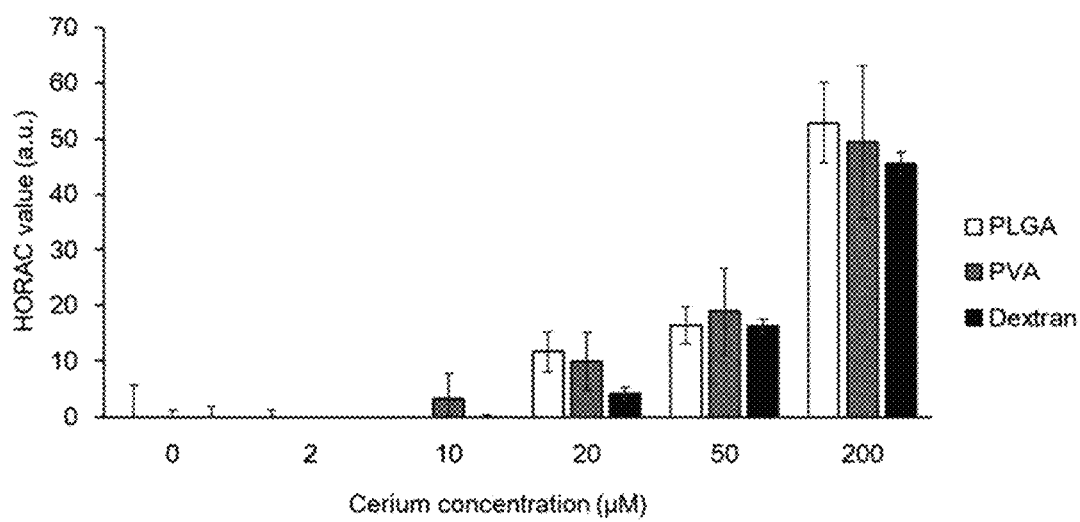

In order to determine the antioxidant effect of the cerium oxide nanocomplex coated with different biocompatible dispersion stabilizers, the scavenging of representative reactive oxygen species, hydrogen peroxide ($H_2O_2$) and hydroxyl radicals (—OH), was investigated. For the analysis of each reactive oxygen species, an Amplex™ Red Hydergen Peroxide/Peroxidase Assay Kit was used for hydrogen peroxide, and hydroxyl radical antioxidant capacity (HORAC) assay was used for hydroxyl radicals. It was confirmed through each analysis that the cerium oxide nanocomplex not only had the function of scavenging various types of reactive oxygen species, but also that this function was proportional to the concentration of the particles (see FIG. 7). In addition, it could be confirmed that although the cerium oxide nanocomplex was coated with different kinds of dispersion stabilizers, the ability to scavenge reactive oxygen species was derived from the core particles by successfully scavenging reactive oxygen species.

Figure 8:
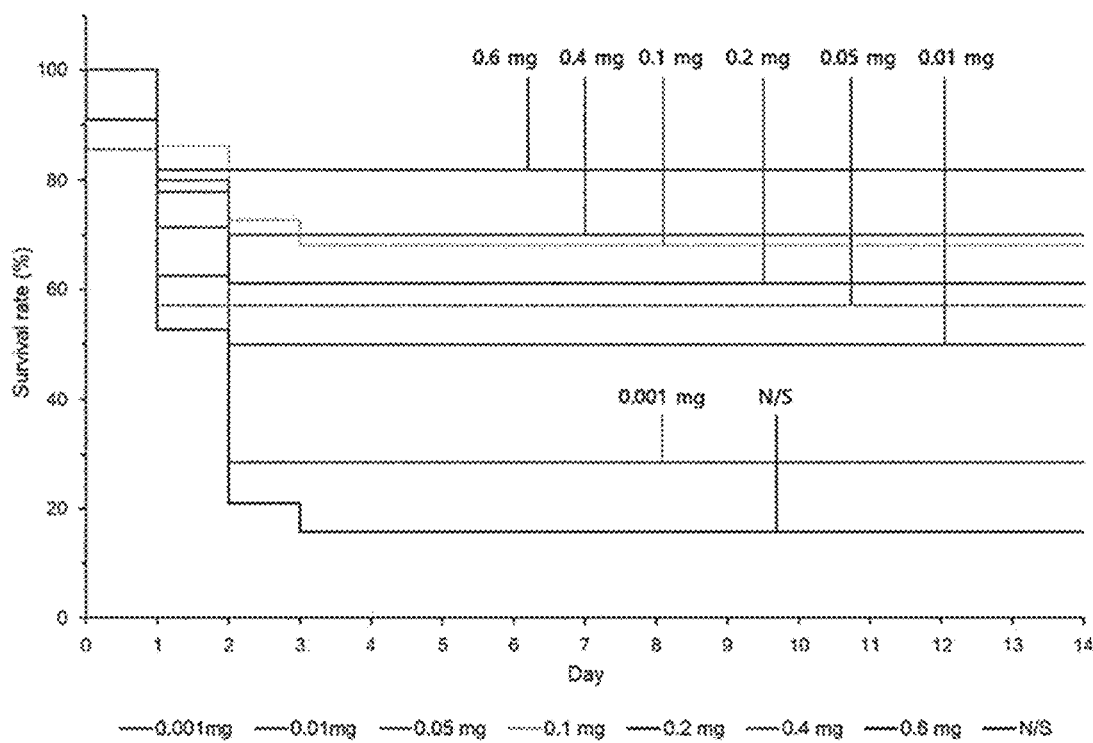
FIG. 8 illustrates that 10 SD rats from 0.001 to 0.05 mg/kg and 20 SD rats from 0.1 to 0.6 mg/kg were tested in each of the above Examples, and 20 SD rats were tested in the control group, and the survival rate thereof is expressed as an average value.

Experimental Example 1: Treatment Effect of Cerium Oxide Nanocomplex for Non-Infectious Inflammatory Diseases In order to confirm the therapeutic effect of the nanocomplex synthesized in the present disclosure for non-infectious inflammatory diseases, an experiment was conducted using an animal model of subarachnoid hemorrhage, which is a representative non-infectious inflammatory disease. In summary, after anesthetizing Sprague-Dawley (SD) rats (Koatech Co., Ltd.) with isoflurane, the left middle cerebral artery was punctured with a 4-0 prolene needle to induce subarachnoid hemorrhage (SAH). After 1 hour from the time when subarachnoid hemorrhage is induced, the cerium oxide nanocomplex prepared in Example 7 was intravenously injected into the SD rats at 0.001, 0.01, 0.05, 0.1, 0.2, 0.4, 0.6 mg/kg over 5 minutes each time, while the same volumes of normal saline were injected to the control SD rats, and it was periodically confirmed whether or not the death of SD rats from the time when the subarachnoid hemorrhage is induced to 14 days. As a result, it was found that when the cerium oxide nanocomplex according to the present disclosure was injected into the SD rats, the mortality was significantly reduced compared to the control group, and specifically, the mortality of the control group was 84.2%, whereas when 0.6 mg/kg of cerium oxide nanocomplex was injected, the mortality was reduced to 18.2% (see FIG. 8).

Figure 9:
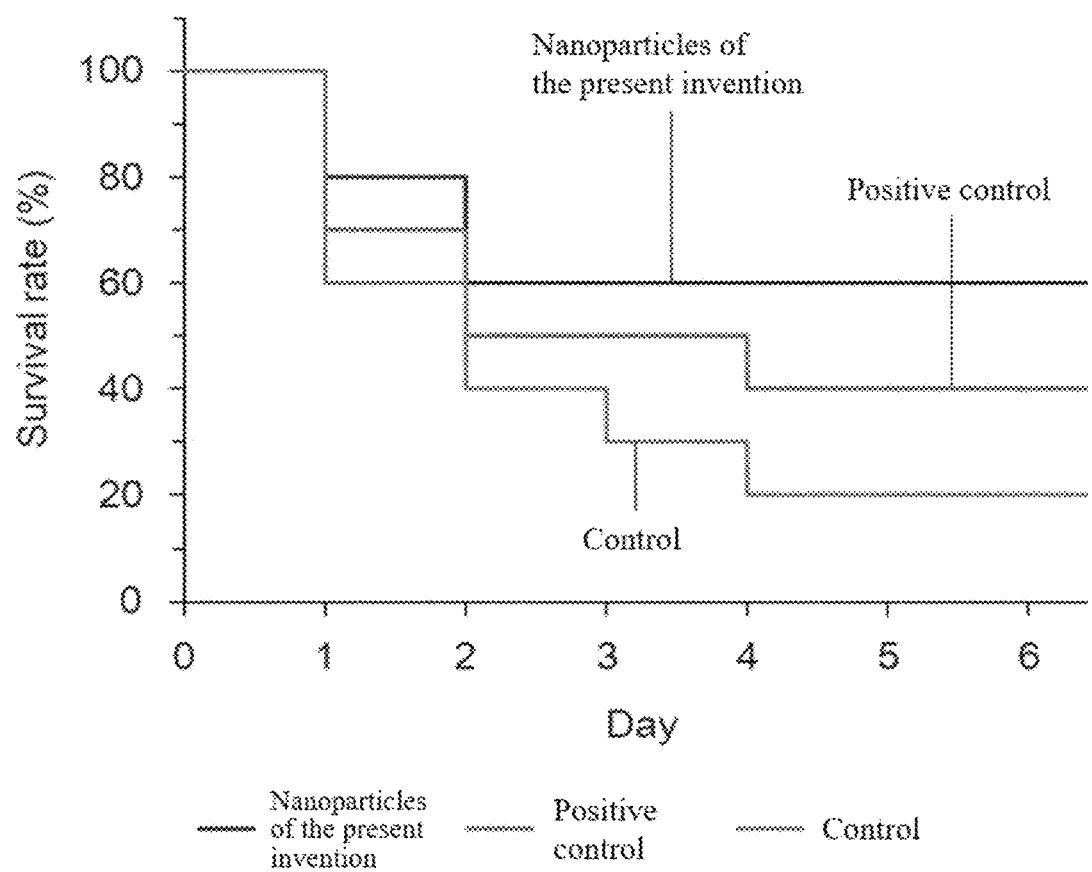
FIG. 9 is a graph in which 10 SD rats were tested in the particles of the present disclosure, a positive control group and a negative control group, and the average value thereof is expressed as a survival rate.

Experimental Example 2: Effect Compared to Previous Studies Results for Treatment of Non-Infectious Inflammatory Diseases In order to compare and evaluate the therapeutic effect of inflammatory diseases of the cerium oxide nanocomplex prepared in Example 7 and the nanocomplex previously developed by the present inventors (Korean Publication No. 10-2018-0043989), subarachnoid hemorrhage (SAH) was induced in the SD rats (Koatech Co., Ltd.) in the same manner as in Experimental Example 1. After 1 hour from the time when subarachnoid hemorrhage is induced, the cerium oxide nanocomplex according to the present disclosure was intravenously injected into the SD rats at 0.05 mg/kg over 5 minutes each time, 0.25 mg/kg of the conventional cerium oxide nanocomplex was injected into SD rats as a positive control group in the same manner, and the same volume of normal saline was injected into the SD rats as a control group. As a result of periodically checking whether or not the death of SD rats from the time when the subarachnoid hemorrhage is induced to 14 days, it was found that the cerium oxide nanocomplex according to the present disclosure and the positive control group showed same mortality (see FIG. 9). Specifically, the mortality of the control group was 84.2%, the mortality of the group injected with the nanocomplex according to the present disclosure was 38.8%, and the mortality of the positive control group was 40%. It was found from the above results that the cerium oxide nanocomplex according to the present disclosure showed a comparable survival rate even at a dose of ⅕ of that of the positive control group, thereby showing a therapeutic effect about 5 times higher to that of the positive control group. It was confirmed through this experiment that the novel nanocomplex according to the present disclosure has a significantly improved therapeutic effect and stability compared to the previous cerium oxide nanocomplex, and thus may be used as an effective composition for treating inflammatory diseases.

Figure 10:
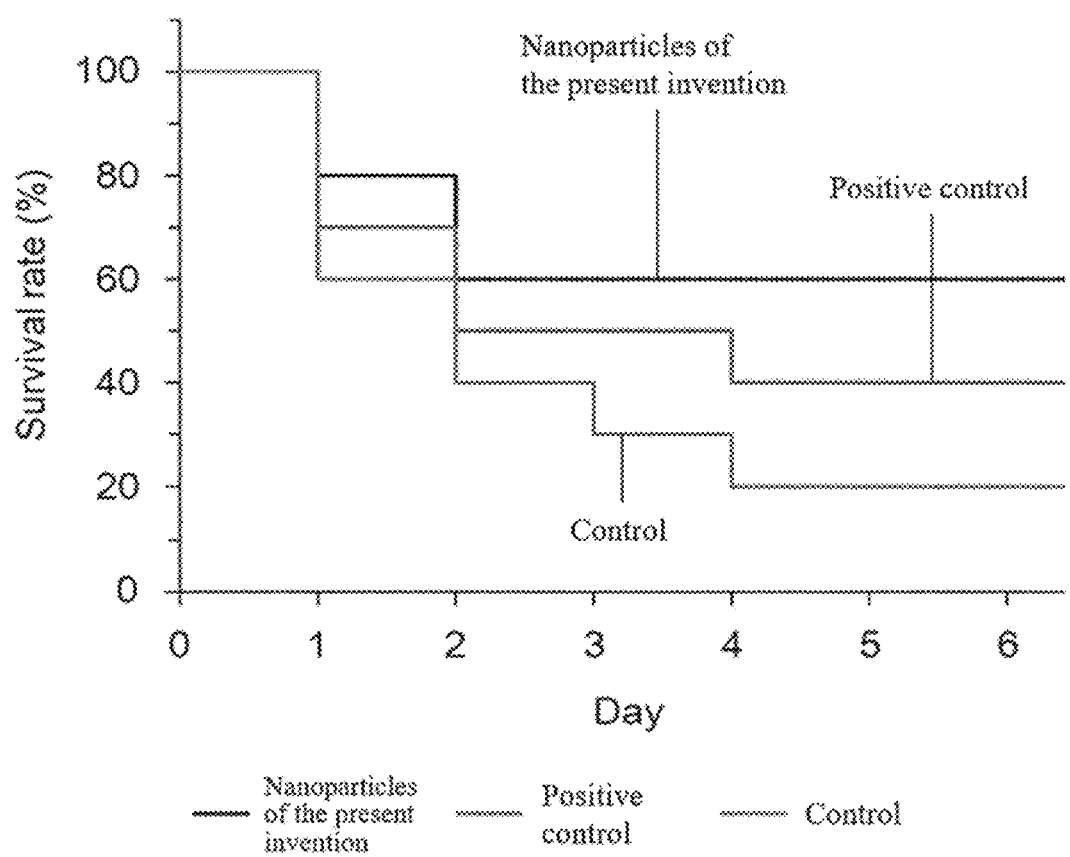
FIG. 10 is a graph in which 10 C57BL/6 mice were tested in the particles of the present disclosure, a positive control group and a negative control group, and the survival rate is expressed as an average value thereof.

Experimental Example 3: Treatment Effect of Cerium Oxide Nanocomplex for Infectious Inflammatory Disease—Sepsis In order to confirm the therapeutic effect of the nanocomplex according to the present disclosure for infectious inflammatory diseases, an animal model of sepsis which is a representative infectious inflammatory disease, was used. A cecal ligation and puncture (CLP) method was used to induce sepsis in 6-week-old male C57BL/6 mice (Koatech Co., Ltd.). Specifically, C57BL/6 mice were anesthetized with isoflurane, disinfected with a betadine solution (10 wt % povidone-iodine), and then skin incision was made to expose the cecum. Then, the cecum was ligated at the distal part of the ileocecal valve using 6-0 silk, and then punctured using a 26-gauge needle. Such perforation leads to excretory leakage into the peritoneum, resulting in polymicrobial bacteremia and sepsis. Immediately after sepsis was induced in the C57BL/6 mice, the cerium oxide nanocomplex according to the present disclosure was injected intravenously at 0.1 mg/kg each once, 0.25 mg/kg of the previous cerium oxide nanocomplex was injected into SD rats as a positive control group, and the same volume of normal saline was injected into the SD rats as a control group. Thereafter, as a result of periodically checking whether or not the death of C57BL/6 mouse from the time when the sepsis is induced to 6 days, it was confirmed that the cerium oxide nanocomplex according to the present disclosure significantly reduced the mortality compared to the positive control group and the control group (see FIG. 10). Specifically, the control group and the positive control have a mortality of 60% and 80%, respectively, whereas the group injected with the nanocomplex according to the present disclosure administered at a dose that was only 0.4 times the dose of the positive control group had a mortality of only 40%.

It could be confirmed through these results that the nanocomplex according to the present disclosure is a remarkably improved technology that exhibits excellent pharmacological effect even at a low dose compared to the previously developed nanocomplex.

Figure 11:
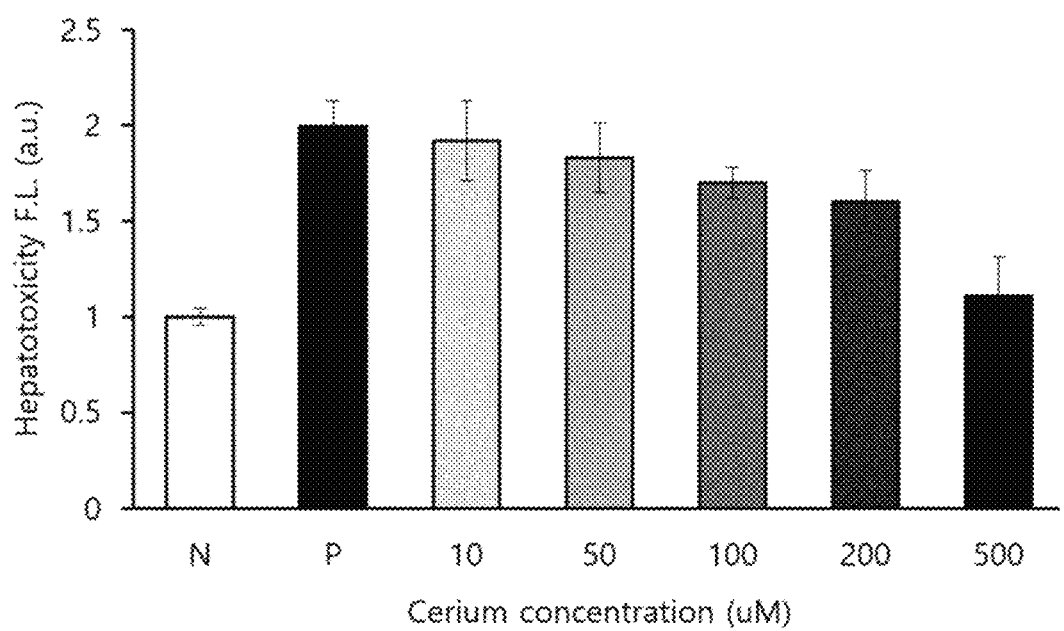
FIG. 11 is a graph showing results of evaluating the toxic stimulation associated with reactive oxygen species after treating hepatocytes (heap-1c1c7) in which the toxic stimulation is induced by pyrogallol with the particles of the present disclosure for each concentration.

Experimental Example 4: Therapeutic Effect of Cerium Oxide Nanocomplex for Infectious Inflammatory Disease—Inflammatory Liver Disease In order to investigate the therapeutic effect of the cerium oxide nanocomplex to treat hepatotoxicity caused by inflammation, the degree of hepatotoxicity derived from pyrogallol was measured. In order to evaluate hepatotoxicity, hepatocytes (heap-1c1c7) were treated with pyrogallol to induce toxic stimuli, and the cerium oxide nanocomplex was treated for 1 hour at each concentration to evaluate the toxic stimulus associated with reactive oxygen species. As illustrated in FIG. 11, it was confirmed that the cerium oxide nanocomplex according to the present disclosure significantly reduced pyrogallol-induced hepatotoxicity in a concentration-dependent manner. It was confirmed that the cerium oxide nanocomplex had an excellent therapeutic effect on hepatocellular toxicity caused by inflammation by showing that hepatotoxicity in the group treated particularly with 500 μM of cerium oxide nanocomplex was reduced to a level similar to that of the negative control group.

Specific portions of the present disclosure have been described in detail hereinabove, but it is obvious to those skilled in the art that such a specific description is only an exemplary embodiment, and the scope of the present disclosure is not limited thereto. Therefore, the substantial scope of the present disclosure will be defined by the claims and equivalents thereof.

The invention claimed is:

1. A cerium oxide nanocomplex comprising:
   (a) a core layer of cerium oxide nanoparticles;
   (b) an inner layer including a polymer represented by the following Formula 1 and a multifunctional ligand represented by the following Formula 2:

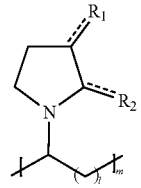

[Formula 1]

wherein $R_1$ is hydrogen and $R_2$ is oxygen, ⁼⁼⁼ represents a single bond or a double bond, l is 1, and m is an integer of 100 to 1000;

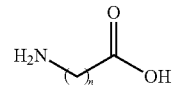

[Formula 2]

wherein
n is an integer of 3 to 7; and
   (c) an outer layer including a biocompatible dispersion stabilizer, wherein the biocompatible dispersion stabilizer is a polyglutamic acid (PGA).

2. The nanocomplex of claim 1, wherein the cerium oxide nanoparticles are selected from the group consisting of cerium (III) oxide ($Ce_2O_3$) nanoparticles, cerium (IV) oxide ($CeO_2$) nanoparticles, and a mixture thereof.

3. The nanocomplex of claim 1, wherein the PGA is poly L-glutamic acid (PLGA).

4. The nanocomplex of claim 1, wherein in Formula 2, n is 5.

5. The nanocomplex of claim 1, wherein the nanocomplex has an average particle size of 5 nm to 100 nm.

6. A method for treating inflammatory or autoimmune diseases in a subject in need thereof, comprising administering the cerium oxide nanocomplex according to claim 1 or a composition comprising the cerium oxide nanocomplex according to claim 1, to the subject.

7. The method of claim 6, wherein the inflammatory or autoimmune diseases are one or more diseases selected from the group consisting of rheumatoid arthritis, reactive arthritis, type 1 diabetes, systemic lupus erythematosus, multiple sclerosis, idiopathic pulmonary fibrosis, polymyositis, dermatomyositis, localized scleroderma, systemic scleroderma, inflammatory bowel disease, Sjogren's syndrome, Raynaud's phenomenon, Bechet's disease, Kawasaki's disease, primary biliary sclerosis, primary sclerosing cholangitis, ulcerative colitis, Crohn's disease, psoriasis, myasthenia gravis, autoimmune vasculitis, primary angiitis of the central nervous system, subarachnoid hemorrhage (SAH), severe cerebral infarction, intracerebral hemorrhage, hypoxic ischemic encephalopathy, traumatic brain/spinal cord injury, acute respiratory distress syndrome, cytokine storm syndrome, sepsis, and inflammatory liver disease.

8. The method of claim 7, wherein the inflammatory or autoimmune disease is selected from the group consisting of subarachnoid hemorrhage, sepsis, cytokine storm syndrome, and inflammatory liver disease.

9. The method according to claim 8, wherein the inflammatory liver disease is selected from the group consisting of viral hepatitis, toxoplasma hepatitis, alcoholic liver disease, toxic liver disease, acute and subacute hepatic failure, liver abscess, nonspecific reactive hepatitis, liver infarction, hepatic veno-occlusive disease, injury of liver or gallbladder, and liver transplantation-related hepatitis.

10. A method for preparing the cerium oxide nanocomplex of claim 1, the method comprising:
(a) preparing a mixed solution by adding a cerium precursor, a polymer represented by the following Formula 1, and a crosslinking compound represented by the following Formula 2 to a $C_1$-$C_3$ alcoholic solvent:

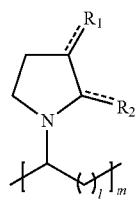

[Formula 1]

wherein $R_1$ is hydrogen and $R_2$ is oxygen, 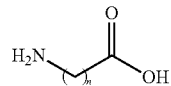 represents a single bond or a double bond, l is 1, and m is an integer of 100 to 1000;

[Formula 2]

$$H_2N-\underset{n}{(CH_2)}-\overset{O}{C}-OH$$

wherein n is an integer of 3 to 7; and (b) sequentially heating and cooling the mixed solution to obtain cerium oxide nanoparticles; and (c) mixing the cerium oxide nanoparticles and a biocompatible dispersion stabilizer in the $C_1$-$C_3$ alcoholic solvent to obtain a cerium oxide nanocomplex coated with the biocompatible dispersion stabilizer, wherein the biocompatible dispersion stabilizer is polyglutamic acid (PGA).

11. The method of claim 10, wherein the $C_1$-$C_3$ alcohol solvent is ethanol.

12. The method of claim 10, wherein the cerium precursor is one or more precursors selected from the group consisting of cerium (III) acetate hydrate, cerium (III) acetylacetonate hydrate, cerium (III) carbonate hydrate, cerium (III) fluoride, cerium (III) chloride, cerium (III) chloride heptahydrate, cerium (III) bromide, cerium (III) iodide, cerium (III) nitrate hexahydrate, cerium (III) oxalate hydrate, cerium (III) sulfate, and cerium (III) sulfate hydrate.

13. The method of claim 10, wherein the heating is performed at 60 to 75° C.

* * * * *